J. K. GOURDIN.
FERTILIZER DISTRIBUTER.
APPLICATION FILED SEPT. 22, 1908.
912,114.
Patented Feb. 9, 1909.
2 SHEETS—SHEET 1.
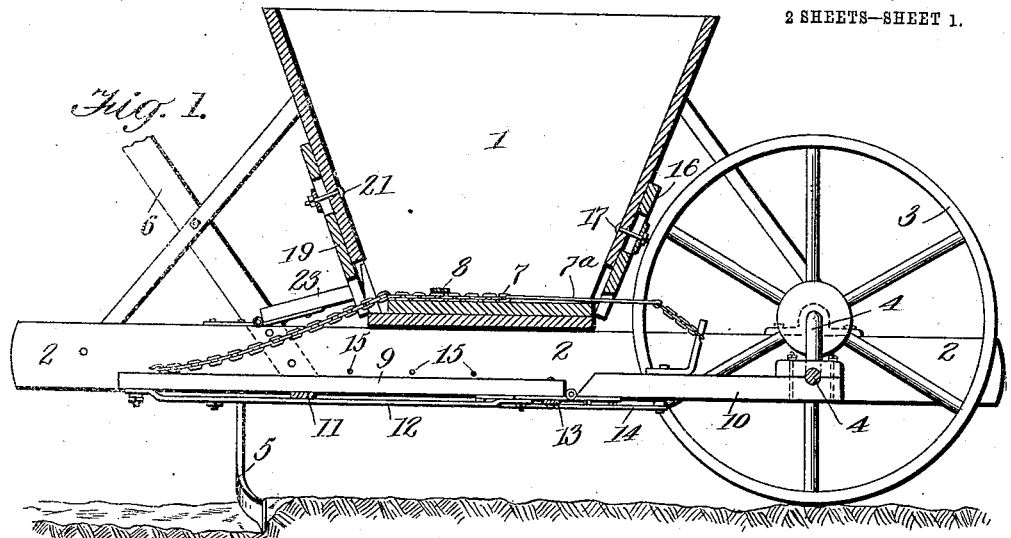
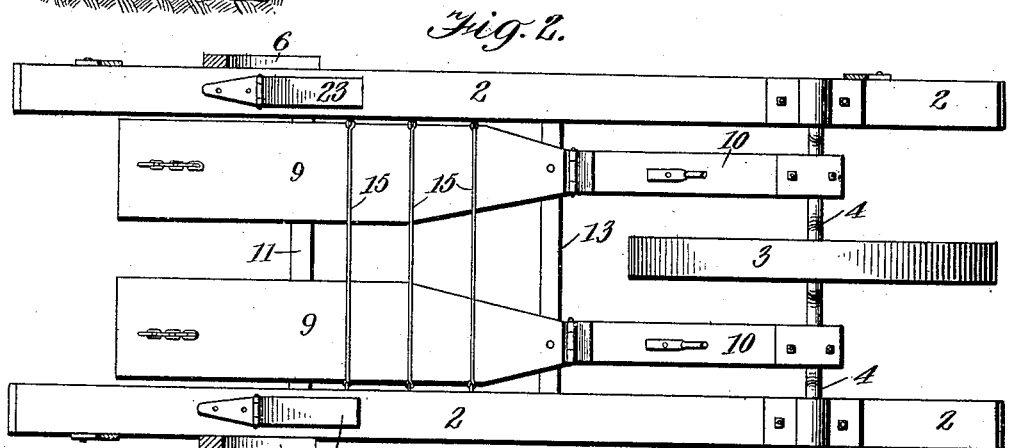
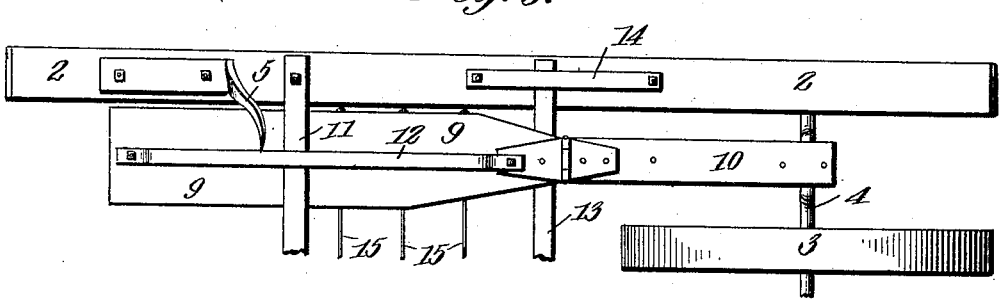
WITNESSES
Samuel E. Wade
J. Middleton
INVENTOR
JOHN K. GOURDIN,
BY Munn & Co.
ATTORNEYS

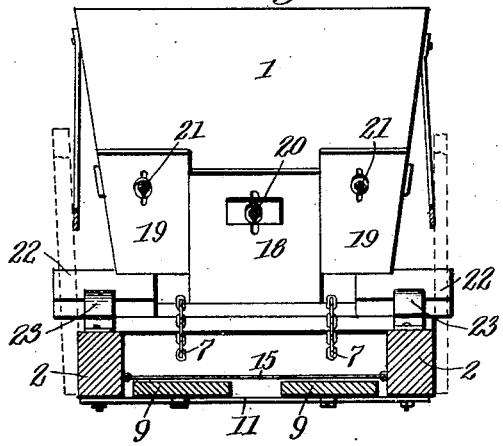
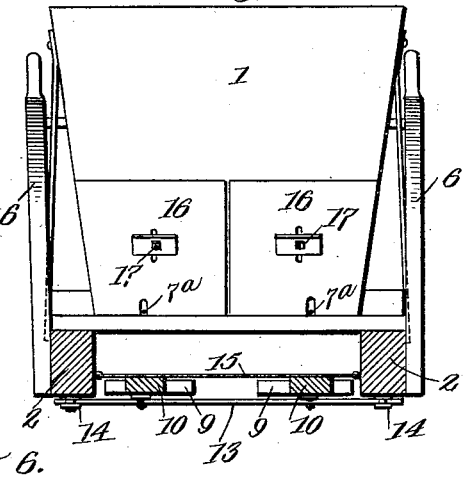
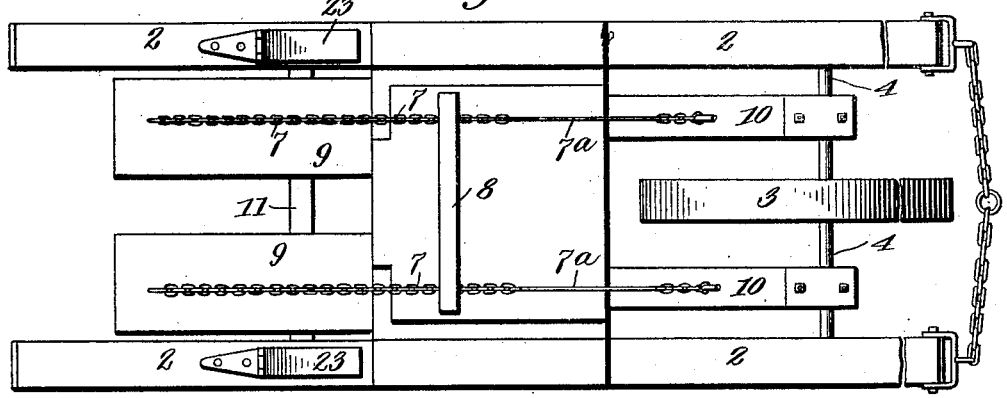
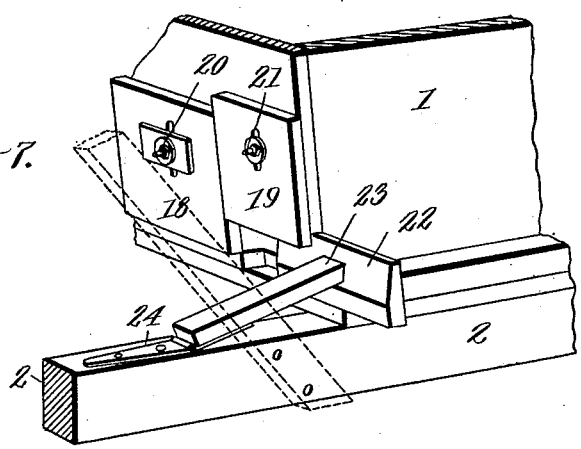

UNITED STATES PATENT OFFICE.

JOHN K. GOURDIN, OF PINEVILLE, SOUTH CAROLINA, ASSIGNOR OF ONE-HALF TO ROBERT L. MONTAGUE AND ROBERT P. TUCKER, OF CHARLESTON, SOUTH CAROLINA.

FERTILIZER-DISTRIBUTER.

No. 912,114.        Specification of Letters Patent.        Patented Feb. 9, 1909.

Application filed September 22, 1908. Serial No. 454,250.

*To all whom it may concern:*

Be it known that I, JOHN K. GOURDIN, a citizen of the United States, and a resident of Pineville, in the county of Berkeley and State of South Carolina, have invented a new and Improved Fertilizer-Distributer, of which the following is a full, clear, and exact description.

My invention pertains particularly to an improved arrangement of means for discharging fertilizer from the hopper, and to improved means for effecting the broadcast distribution of the fertilizer after discharge from the hopper.

The details of construction, combination, and operation of parts are as hereinafter described and illustrated in the accompanying drawing in which—

Figure 1 is a longitudinal section of my improved distributer. Fig. 2 is a horizontal section taken on a line below the bottom of the hopper. Fig. 3 is a bottom plan view of a portion or one side of the hopper. Fig. 4 is a vertical transverse section taken just in rear of the hopper. Fig. 5 is a vertical cross section taken just in front of the hopper. Fig. 6 is a plan view of the distributer omitting the sides or box portion of the hopper. Fig. 7 is a perspective view illustrating the means for regulating the discharge openings in the rear of the hopper.

Referring in the first instance particularly to Fig. 1, the numeral 1 indicates the hopper, 2 the side bars of the frame, and 3 a transporting wheel mounted upon a double crank-axle 4, in front of the hopper. 5 indicates coverers which project inward or toward each other. The above parts are constructed, arranged, and operated in a well-known manner. Handles 6, see Figs. 1 and 5, are attached to the side bars 2 and extend rearwardly and upwardly therefrom in the usual way.

The fertilizer contained in the hopper is agitated and discharged by means of two chains 7 which are connected by cross-bar 8; see especially Figs. 1 and 6. The chains are arranged parallel and spaced from each other and work in discharge openings in the rear side of the hopper and they are connected transversely within the latter by means of the cross-bar 8. By this simple means I form a superior agitator and pulverizer for the fertilizer, and for discharging the same from the hopper. The chains, with the cross bar 8, are constantly reciprocated as the machine advances. For this purpose, the chains are attached to devices connected with the double crank-axle 4, and receive a reciprocating motion therefrom. As shown in Fig. 2, broad plates 9 are arranged side by side, parallel, and connected by hinged bars 10 with the two cranks of the axle 4. The said plates 9 are supported in their longitudinal reciprocation by means of a transverse bar 11, see Figs. 1, 2, 3, 4, the ends of the same being attached to the under side of the bars or beams 2 of the frame. For the purpose of holding the plates 9 on said bar while reciprocating, a longitudinal metal strip 12 is secured to the under side of the same, and spaced from the plate sufficiently to receive the supporting cross-bar 11. The said strip 12 is, therefore, in the nature of a keeper. The front ends of the plates 9 are attached to a cross-bar 13, and the ends of the latter are supported and slide on guide strips 14, see Fig. 3, which are attached to the under side of the frame bars 2. It is apparent that the plates 9 are reciprocated horizontally through their connection with the crank-shaft by means of the hinged bars 10.

As indicated in several figures, the plates 9 are so located with reference to the discharge openings in the hopper 1, that the fertilizer falls in the first instance directly upon them, and since they are constantly reciprocated, or shaken endwise, so to speak, the fertilizer is scattered on the same and falls over the side edges and rear end. It is, however, of great importance that the fertilizer thus delivered upon the distributing plates 9, shall be quickly leveled or spread out thereon in order to cause the fertilizer to be distributed in the required manner and with due rapidity. For this purpose I employ a special means, which, after many experiments, I have found most effective, to wit, a series of transverse wires 15 which extend over plates 9, as shown in Figs. 2 and 4, between the side bars 2 of the frame to which they are loosely attached. These cross rods or wires being stationary, and the plates 9 being constantly reciprocated, the fertilizing material discharged in a row on the plates is quickly leveled and distributed over the surface of the plates and thus discharged therefrom over their edges.

The reciprocation of the chains 7, before referred to, which pass through holes in the front and rear sides of the hopper 1 and over the false bottom of the latter, is due to their connection with the rear ends of the distributing plates 9 and the front portions of the connecting bars 10. It will be noted, however, that the chains proper do not pass through the front openings in the hopper, since it is not desired to effect discharge of the fertilizer at that point, and, therefore, rods 7ª are employed in place of chains at such point, and thus form practically a continuation of or extended link in the chains. It is obvious that the rods 7ª will slide through a small opening with comparatively little friction and that very little of the fertilizer will be discharged at the front openings in the hopper.

I provide the front side of the hopper with vertically adjustable plates 16, the same having open slots or notches in their lower ends to accommodate the rods 7ª. The said plates are adapted for adjustment by means of vertical slots through which clamp-screws 17 pass, as indicated in Figs. 1 and 5. The rear side of the hopper is provided with other vertically adjustable plates 18 and 19 the same being secured by clamp-screws 20 and 21 respectively, as illustrated in Figs. 1, 4 and 7. By adjusting the plates 19 higher or lower, it is obvious that the discharge openings in the rear of the hopper will be widened or contracted. For effecting the same result in respect to their lateral dimension, I provide slides 22, see Figs. 4 and 7, which are adjustable laterally, endwise, and are clamped in any adjustment by means of hinged bars 23. The latter are hinged at 24 to the side bars 2 of the frame and their free ends engage the beveled or inclined upper portion of the slides 22. By raising the free end of the clamping bars 23, the slides 22 are released and may be adjusted to narrow the discharge openings laterally, and, by pressing down on the free ends of said bars 23, the slides 22 are engaged and locked by friction. The adjustment of the slides 19 and 22 adapts the machine for distributing fertilizer in any desired quantity, or according to its condition, that is to say, whether fine or coarse and lumpy. The slide 18 may be raised or adjusted upward when it is desired to use the machine for distributing cotton seed.

I claim:

1. In a fertilizer distributer, the combination with the wheel, crank axle, and hopper having an imperforate bottom and a discharge opening in the rear side, of distributing plates arranged beneath the bottom of the hopper and extending rearward beyond it, and devices arranged and operating within the hopper for agitating the fertilizer and discharging it through the rear opening, as shown and described.

2. In a fertilizer distributer, the combination with the hopper having an imperforate bottom and a discharge opening in the rear side, a transporting wheel, and a crank axle whereon said wheel is mounted, of a horizontally reciprocating plate arranged beneath the bottom of the hopper and extending rearwardly beyond the same, whereby it is adapted to receive fertilizer as discharged therefrom, a bar connecting such plate with the crank axle, a chain passing through the hopper over the bottom thereof and attached to the rear portion of said plate and at its forward end to the connecting bar, whereby, when moved rearwardly, the chain agitates the fertilizer and causes its discharge from the rear opening so that it falls upon the distributing plate, as shown and described.

3. In a fertilizer distributer, the combination with the hopper having a discharge opening, and a discharge device working through the said opening, of means for adjusting the size of the opening, the same consisting of a vertically adjustable plate, and means for clamping it, and a laterally adjustable plate 22, and means for clamping it in the required adjustment, substantially as described.

JOHN K. GOURDIN.

Witnesses:
E. M. GOURDIN,
E. S. SAULS.